United States Patent
Maruyama et al.

(10) Patent No.: US 10,406,632 B2
(45) Date of Patent: Sep. 10, 2019

(54) LASER MACHINING DEVICE

(71) Applicant: Koike Sanso Kogyo Co., Ltd., Tokyo (JP)

(72) Inventors: Yoichi Maruyama, Tokyo (JP); Satoshi Masuda, Tokyo (JP); Keisuke Nakagawa, Tokyo (JP); Takumi Omori, Tokyo (JP)

(73) Assignee: Koike Sanso Kogyo Co., Ltd., Tokyo (JP)

(*) Notice: Subject to any disclaimer, the term of this patent is extended or adjusted under 35 U.S.C. 154(b) by 337 days.

(21) Appl. No.: 15/305,313

(22) PCT Filed: Apr. 21, 2015

(86) PCT No.: PCT/JP2015/062050
§ 371 (c)(1),
(2) Date: Dec. 29, 2016

(87) PCT Pub. No.: WO2015/163303
PCT Pub. Date: Oct. 29, 2015

(65) Prior Publication Data
US 2017/0165788 A1    Jun. 15, 2017

(30) Foreign Application Priority Data
Apr. 22, 2014    (JP) .................................. 2014-088055

(51) Int. Cl.
*B23K 26/12* (2014.01)
*B23K 26/21* (2014.01)
(Continued)

(52) U.S. Cl.
CPC ........ *B23K 26/128* (2013.01); *B23K 26/0876* (2013.01); *B23K 26/127* (2013.01);
(Continued)

(58) Field of Classification Search
None
See application file for complete search history.

(56) References Cited

U.S. PATENT DOCUMENTS 3,984,696 A * 10/1976 Collica ................. A61B 6/107
                                                250/519.1
4,931,642 A *  6/1990 Hosoi .................. G01T 1/2014
                                                250/586
(Continued)

FOREIGN PATENT DOCUMENTS

JP    H04-113183       10/1992
JP    H09-295180 A     11/1997
JP    2006-315356 A    11/2006

OTHER PUBLICATIONS

International Search Report in application No. PCT/JP2015/062050, Report dated Aug. 4, 2015 (8 pages).
(Continued)

*Primary Examiner* — Ibrahime A Abraham
*Assistant Examiner* — Gyounghyun Bae
(74) *Attorney, Agent, or Firm* — Shlesinger, Arkwright & Garvey LLP (57) ABSTRACT

A laser machining device having a surface plate upon which a material to be machined is placed, a rail, a saddle, a garter, a horizontal carriage, and a laser nozzle. On it is attached: a machining trolley that causes the saddle to travel along rail, causes the horizontal carriage to travel horizontally along garter, irradiates laser light from laser nozzle towards a material to be machined, and cuts or welds the material. A cover is provided that covers substantially the entire surface of machining trolley and has an upper surface cover, a laser nozzle-side cover, a garter-side cover, and a side surface body. On a lower end side of the laser nozzle-side cover and the garter-side cover, there is a flexible light-blocking member for preventing laser light from leaking from a gap
(Continued)

between the lower end section and the upper surface of the surface plate.

9 Claims, 6 Drawing Sheets

(51) Int. Cl.
  *B23K 26/38* (2014.01)
  *B23K 26/70* (2014.01)
  *B23K 37/02* (2006.01)
  *B23K 26/08* (2014.01)

(52) U.S. Cl.
  CPC .............. *B23K 26/21* (2015.10); *B23K 26/38* (2013.01); *B23K 26/706* (2015.10); *B23K 37/0235* (2013.01)

(56) References Cited

U.S. PATENT DOCUMENTS

| | | | | |
|---|---|---|---|---|
| 4,982,096 | A * | 1/1991 | Fujii | G01T 1/2018 250/366 |
| 5,438,454 | A * | 8/1995 | Ludewigt | A61N 5/1042 250/505.1 |
| 5,481,083 | A * | 1/1996 | Smyth, Jr. | B23K 26/0838 219/121.67 |
| 5,523,578 | A * | 6/1996 | Herskovic | A61N 5/01 250/492.3 |
| 5,560,843 | A * | 10/1996 | Koike | B23K 26/06 219/121.48 |
| 5,635,086 | A * | 6/1997 | Warren, Jr. | B23K 10/00 219/121.39 |
| 6,069,196 | A * | 5/2000 | Akao | C08K 5/0008 524/107 |
| 6,128,546 | A * | 10/2000 | Basista | G05B 19/4205 219/121.67 |
| 6,284,999 | B1 * | 9/2001 | Virtanen | B23K 26/046 219/121.67 |
| 6,703,632 | B1 * | 3/2004 | Macklis | A61N 5/10 250/515.1 |
| 6,846,098 | B2 * | 1/2005 | Bourdelais | G02B 5/0221 359/599 |
| 7,436,473 | B2 * | 10/2008 | Nam | G02F 1/133512 349/110 |
| 7,674,998 | B2 * | 3/2010 | Ohnishi | B23K 7/00 219/121.39 |
| 7,960,669 | B2 * | 6/2011 | Yamaguchi | B23K 10/006 219/121.39 |
| 8,624,154 | B2 * | 1/2014 | McElroy | B23K 26/032 219/121.68 |
| 9,869,811 | B2 * | 1/2018 | Lu | G02B 6/0036 |
| 2007/0258502 | A1 | 11/2007 | Harrison | |
| 2012/0160816 | A1 | 6/2012 | Hubert | |

OTHER PUBLICATIONS

Written Opinion of the ISA in application No. PCT/JP2015/062050, Opinion dated Aug. 4, 2015 (4 pages).

* cited by examiner

LASER MACHINING DEVICE

TECHNICAL FIELD

The present invention relates to a laser machining device for cutting or welding a material to be machined by irradiating the material to be machined with laser light, and especially relates to a laser machining device configured to prevent the laser light reflected from a portion to be machined from leaking outside the device.

BACKGROUND ART

Cutting or welding by irradiating a material to be machined with laser light through a laser nozzle has been performed. In a case where the material to be machined is a steel plate, a carbon dioxide laser with a wavelength of 10.6 μm is typically used. Further, in recent years, layers having a wavelength of about 1/10 the wavelength of the carbon dioxide laser, such as a solid-state laser including a YAG laser, and a fiber laser have received attention as means for machining a steel plate.

Although most of the laser light radiated on a portion to be machined of the material to be machined is absorbed by the material to be machined and melts a base material, a part of the laser light is reflected from a surface of the material to be machined and a surface of a molten material. At this time, a reflecting direction of the laser light is not managed at all, and the laser light is reflected into every direction. For example, in a case where laser machining is laser cutting of the material to be machined, the laser light that has penetrated the material to be machined in a thickness direction is reflected from a support plate that supports the material to be machined and a bottom surface of a surface plate provided with the support plate.

Then, the reflected laser light is attenuated while again colliding with and being reflected from frames and the like that configure the laser machining device. However, a part of the reflected laser light is scattered around through a gap formed between the surface of the material to be machined and the laser machining device.

The laser light is harmful to the human body, and even the attenuated reflected light may harm people. Therefore, a safety standard including power density, maximum permissible exposure, and the like is set (JIS C6802). To meet the safety standard, covering the laser machining device with a cover has been performed.

SUMMARY OF INVENTION

Technical Problem

However, the thickness of the material to be machined is not constant, and is changed in the range of the specification set in advance. Therefore, even if the laser machining device is covered with a cover, the gap is inevitably caused between the cover and the material to be machined. Further, to avoid collision of the cover against the surface plate, a gap is formed between the cover and the surface plate. Then, the reflected light of the irradiated laser light may also leak through the gap.

Further, covering the entire region where the laser machining device is moved with a cover is also performed. In this case, even if the reflected light of the laser light radiated on the material to be machined leaks from the laser machining device, leakage from the cover can be prevented. However, there is a problem that a structure and work to carry in and out the material to be machined to and from the region covered with the cover become complicated.

An objective of the present invention is to provide a laser machining device that can prevent leakage of reflected light of laser light radiated on a material to be machined.

Solution to Problem

To solve the above problem, the inventors of the present case have developed a laser machining device that can prevent leakage of laser light from a viewpoint that, in a case where a machining trolley itself, on which a laser nozzle is mounted, is covered with a cover, it is favorable if no gap is formed between a lower end portion of the cover, and an upper surface of a surface plate and an upper surface of a material to be machined, and reflected light of the laser light radiated on the material to be machined does not pass through a gap.

However, the thickness and the width dimension of the material to be machined are changed. Therefore, it is not possible to eliminate the gap between the cover and the material to be machined. Therefore, a possibility that the reflected light passes through the gap has been discussed. That is, the direction of the reflected light when the laser light is irradiated has been discussed, assuming a case in which a part of the material to be machined in a most severe state that would be caused in conducting laser machining, or an end material existing on the surface plate is inclined with respect to the upper surface of the surface plate at an angle of 45 degrees.

As a result, it has been found that, when the material to be machined or the end material existing on the surface plate in the inclined state by 45 degrees is irradiated with the laser light, the reflected light leaks through the gap formed between the lower end portion of the cover, and the upper surface of the surface plate and the upper surface of the material to be machined. Therefore, it has been concluded that a configuration to block the gap formed between the lower end portion of the cover, and the upper surface of the surface plate and the upper surface of the material to be machined is necessary.

However, as described above, the plate thickness, the width, and the length dimension of the material to be machined are not constant, and can be freely selected within a range of a specification set in advance. Further, machining of the material to be machined is two-dimensional, and the machining trolley is reciprocated along rails. Therefore, handling the variation of the plate thickness is a condition to block the gap formed between the lower end portion of the cover, and the upper surface of the surface plate and the upper surface of the material to be machined, and having flexibility is another condition to handle the reciprocation of the machining trolley along the rails.

Therefore, a laser machining device according to the present invention cuts or welds a material to be machined by irradiating the material to be machined with laser light, and includes: a surface plate on which the material to be machined is placed; rails arranged along the surface plate; a machining trolley including a saddle mounted on the rails, a garter arranged in a direction perpendicular to the rails and connected to the saddle, a transverse carriage mounted on the garter, and a laser nozzle mounted on the transverse carriage, and configured to cut or weld the material to be machined by irradiating the material to be machined with the laser light through the laser nozzle while allowing the saddle to travel along the rails and the transverse carriage to perform traverse along the garter; and a cover that covers approximately an entire surface of the machining trolley, and includes an upper surface cover body arranged on an upper surface side of the machining trolley, a laser nozzle-side cover body arranged on a laser nozzle side of the machining trolley and having an upper end connected to the upper surface cover body, a garter-side cover body arranged on an opposite side to the laser nozzle of the machining trolley and having an upper end connected to the upper surface cover body, and a side surface cover body having an upper end connected to the upper surface cover body and both ends in a width direction connected to the laser nozzle-side cover body and the garter-side cover body, wherein a light-blocking member having flexibility is attached to lower end sides of the laser nozzle-side cover body and the garter-side cover body that configure the cover, the light-blocking member being for preventing leakage of the laser light through gaps between the lower end portions and the upper surface of the surface plate.

In the laser machining device, an eaves-like cover body formed into an eaves shape is favorably attached to a lower end of the laser nozzle-side cover body or the garter-side cover body that configures the cover in a direction along the rails, and the light-blocking member having flexibility is favorably attached to a lower end side of the eaves-like cover body, the light-blocking member being for preventing leakage of the laser light through a gap between the lower end portion and the upper surface of the surface plate.

Further, in any of the laser machining devices, the light-blocking member is favorably configured from a plurality of sheets that has flexibility and a light-blocking property, and is layered, and it is favorable to attach an upper end of the layered sheets to the lower end side of the laser nozzle-side cover body, the garter-side cover body, or the eaves-like cover body. Further, the light-blocking member is favorably configured from the plurality of sheets that has flexibility and a light-blocking property, and is layered, and favorably has a slit in a different position in every sheet.

Further, in any of the laser machining devices, the laser light is favorably emitted from a solid-state laser oscillator or a fiber laser oscillator.

Further, in any of the laser machining devices, the surface plate favorably includes a plurality of partition plates that rises from a bottom surface of the surface plate and partitions the surface plate, and a plurality of support members arranged between the partition plates and having a lower end not reaching the bottom surface of the surface plate, and an interval between the plurality of partition plates is favorably smaller than a smallest distance, of a distance from the laser nozzle of the machining trolley to the light-blocking member attached to the lower end side of the laser nozzle-side cover body, a distance from the laser nozzle to the light-blocking member attached to the lower end side of the eaves-like cover body attached to the lower end side of the laser nozzle-side cover body, a distance from the laser nozzle to the light-blocking member attached to the lower end side of the garter-side cover body, and a distance from the laser nozzle to the light-blocking member attached to the lower end side of the eaves-like cover body attached to the lower end side of the garter-side cover body.

Advantageous Effects of Invention

In the laser machining device according to the present invention, the entire surface of the machining trolley that travels on the rails is covered with the cover, and the light-blocking members that prevent leakage of the laser light through the gaps between the laser nozzle-side cover body and the garter-side cover body, and the upper surface of the surface plate are attached to lower ends of the laser nozzle-side cover body and the garter-side nozzle-side cover body provided on both sides of the machining trolley in the traveling direction. Therefore, the laser light radiated on the material to be machined can be prevented from leaking outside the cover.

Especially, the light-blocking member has flexibility, and thus even if the plate thickness of the material to be machined placed on the surface plate is changed and the dimension of the gap is changed, the lower end portion of the light-blocking member rubs the upper surface of the surface plate and the upper surface of the material to be machined and is deformed with the traveling of the machining trolley. Therefore, no gap is caused between the surface plate and the upper surface of the material to be machined, and leakage of the reflected laser light from the cover can be prevented.

Further, the eaves-like cover body formed into an eaves shape in the direction along the rails is attached to the lower end of the laser nozzle-side cover body or the garter-side cover body that configures the cover, and the light-blocking member is attached to the lower end side of the eaves-like cover body. Therefore, leakage of the reflected light can be reliably prevented.

Further, the light-blocking member is configured from the plurality of sheets that has flexibility and a light-blocking property, and is layered, and the upper end of the layered sheets is attached to the lower end side of the laser nozzle-side cover body, the lower end side of the garter-side cover body, or the lower end side of the eaves-like cover body, whereby leakage of the reflected laser light can be reliably prevented.

Further, in the case where the light-blocking member is configured from the plurality of sheets that has flexibility and a light-blocking property, and is layered, the slit is formed in a different position in every layered sheet, so that the unit length to be bent can be made short, and more flexible bending can be realized. Especially, the slit exists in the different position in every layered sheet, and thus even if the layered portions are bend in the same manner, the reflected light cannot leak because the positions of the slits are different.

Further, even in a case where the laser machining device is configured as a cutting device, in which the surface plate is configured from the partition plates rising from a bottom surface of the surface plate, and the plurality of support members arranged between the partition plates, and the interval between the plurality of partition plates is smaller than the smallest distance, of the distance from the laser nozzle to the light-blocking member attached to the lower end side of the laser nozzle-side cover body, the distance from the laser nozzle to the light-blocking member attached to the lower end side of the eaves-like cover body attached to the lower end side of the laser nozzle-side cover body, the distance from the laser nozzle to the light-blocking member attached to the lower end side of the garter-side cover body, and the distance from the laser nozzle to the light-blocking member attached to the lower end side of the eaves-like cover body attached to the lower end side of the garter-side cover body, the laser light having penetrated the material to be machined cannot leak from the cover even if the laser light is reflected from the partition plate or the support plate that configures the surface plate.

DESCRIPTION OF EMBODIMENTS

Hereinafter, a laser machining device according to the present invention will be described. The laser machining device according to the present invention is configured to prevent laser light reflected from a surface of a material to be machined or a molten material in a portion to be machined from leaking outside, in performing cutting machining or welding machining by irradiating the material to be machined with the laser light. Especially, the laser machining device according to the present invention prevents leakage of reflected light through gaps formed between a cover and a surface plate and between the cover and the material to be machined, by covering an entire machining trolley that configures the laser machining device, and providing a light-blocking member having flexibility to lower end portions of a laser nozzle-side cover body and a garter-side cover body 13 arranged in front and back portions in a traveling direction.

In the present invention, the laser machining device is configured as a laser cutting device or a laser welding device. Especially, in a case where the laser machining device is configured as the laser cutting device, the laser light radiated on a material to be cut penetrates the material to be cut in a thickness direction and enters an inside of the surface plate, and is reflected from an inner surface of the surface plate. Further, in a case where the laser machining device is configured as the welding device, the laser light radiated on a material to be welded does not penetrate the material to be welded and is reflected from a welded portion. Therefore, the laser machining device according to the present invention is configured to prevent leakage of reflected laser light even if the laser light radiated on the material to be machined is reflected into any direction.

The laser light radiated on the material to be machined is not especially limited, and any of a solid-state laser including a YAG laser with a wavelength of 1.07 μm, a fiber laser, and a carbon dioxide laser with a wavelength of 10.6 μm can be employed.

The light-blocking member has flexibility and a light-blocking property, and has a length in which an upper end portion is attached to a laser nozzle-side cover body or a garter-side cover body that configure a cover, and a lower end portion is positioned below a lower surface of the material to be machined. Therefore, the light-blocking member is configured such that, even if a traveling direction of the machining trolley that configures the laser machining device is changed, a bending direction is changed following the change, and the gap formed between the cover and the surface plate and the gap formed between the cover and the material to be machined are blocked, accordingly.

As the light-blocking member having flexibility and a light-blocking property, a synthetic resin sheet having flexibility including rubber, a metal sheet having flexibility and including phosphor bronze, spring steel, or aluminum can be selectively employed.

The light-blocking member is arranged over approximately the entire length of the machining trolley, and thus resistance becomes large when being bent and a gap may be caused in association with the bending, if the light-blocking member is one sheet. Therefore, it is favorable to subdivide the light-blocking member at appropriate width dimensions to improve the flexibility of the individual subdivided light-blocking members. To subdivide the light-blocking member, it is good to make the light-blocking members, which are cut into intended dimensions, be connected. However, work to attach the individual light-blocking members to the laser nozzle-side cover body and the garter-side cover body is complicated, and thus it is favorable to subdivide the light-blocking member in a curtain manner by making a slit into the sheet light-blocking member.

When the lower end portion of the light-blocking member comes in contact with the surface plate or the surface of the material to be machined and is bent, a gap is caused in the slit portion and the laser light may leak through the gap. Therefore, it is favorable to configure the light-blocking member by layering a plurality of sheets having flexibility and a light-blocking property. Especially, it is favorable to make slits into the layered sheets, respectively, and shift the positions of the slits and attach the sheets.

The number of the sheets to be layered in configuring the light-blocking member is not especially limited, and two or more sheets are favorable although the favorable numbers are different depending on the material quality and the thickness. However, if the number of layers is increased, the flexibility may be impaired, and thus there is a natural upper limit. According to the knowledge of the inventors of the present case, in a condition using rubber sheets with the thickness of about 2 mm, leakage of the reflected light can be prevented by two to four layers. It can be said that it is favorable to layer three sheets, in consideration of retention of the flexibility and the frequency of replacement.

Next, an embodiment in which the present invention is applied to a laser cutting device will be described using FIG. 1 to FIGS. 6(a) to 6(b). Note that, in FIGS. 2(a) and 2(b), a portion where no surface plate is illustrated is a region to which a cutting trolley is retracted when a material to be cut is carried in and out to and from the surface plate.

The laser cutting device according to the present embodiment is configured such that a cutting trolley A on which a laser nozzle is mounted is covered with a cover B, and a light-blocking member C having flexibility is attached to a lower end portion of the cover B. Then, with the attachment of the light-blocking member C, the laser cutting device is configured to prevent reflected light reflected from a cut portion from leaking outside the cover B in conducting laser cutting of a material to be cut F placed on a surface plate D while traveling along rails E.

Figure 3:
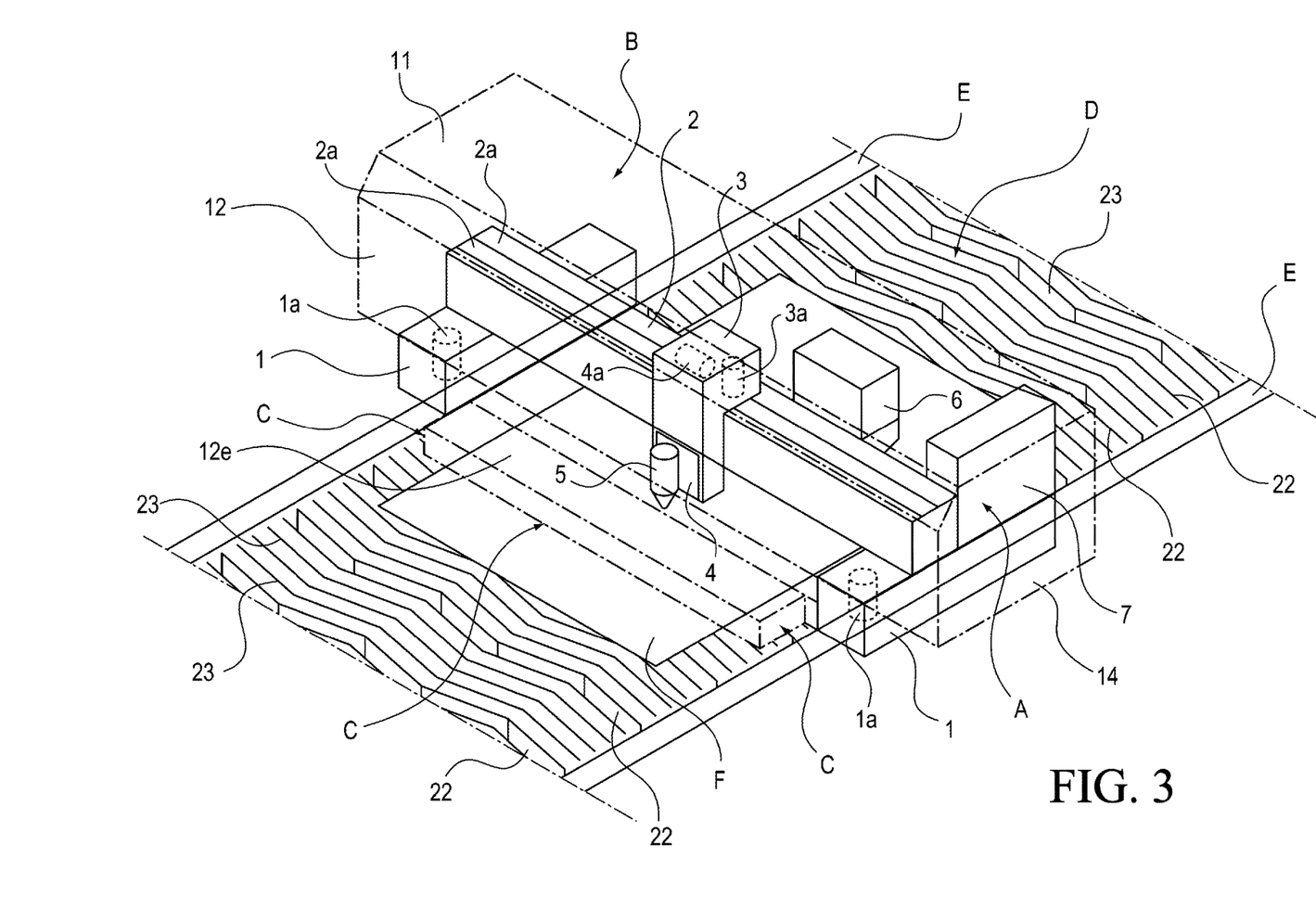
FIG. 3 is a diagram for schematically describing a configuration when the laser machining device is a cutting device.

First, a configuration of the cutting trolley A serving as a machining trolley will be described with reference to FIG. 3. Note that a basic configuration of the cutting trolley A is approximately the same as a typically used laser cutting device, and thus the description will be briefly given.

The cutting trolley A includes a saddle 1 mounted on the rails E, a garter 2 arranged in a direction perpendicular to a laying direction of the rails E and connected to the saddle 1, a transverse carriage 3 mounted on the garter 2, and a laser nozzle 5 mounted on the transverse carriage 3 through a lifting device 4.

A laser oscillator 6 is placed on the cutting trolley A, and the laser oscillator 6 and the laser nozzle 5 are connected by an optical path (not illustrated). For example, in a case where the laser oscillator 6 is a solid-state laser including a YAG laser or a fiber laser, the laser oscillator 6 is fixed to a bracket provided in the garter 2, and is connected with the laser nozzle 5 through optical fiber. Further, in a case where the laser oscillator 6 is a carbon dioxide laser, the laser oscillator 6 is fixed to the transverse carriage 3, and is connected with the laser nozzle 5 through a bellows-like optical path.

A traveling motor 1a is arranged in the saddle 1, and the cutting trolley A is configured to travel at a desired speed in a desired direction along the rails E by controlling a rotating direction and a rotational speed of the traveling motor 1a. Further, a transverse motor 3a is arranged in the transverse carriage 3, and transverse carriage 3 is configured to perform traverse along transverse rails 2a provided on the garter 2 by controlling a rotating direction and a rotational speed of the transverse motor 3a. Further, a lifting motor 4a is arranged in the transverse carriage 3, and the transverse carriage 3 can lift the laser nozzle 5 by controlling rotation of the lifting motor 4a.

A numerical value control device is accommodated in the saddle 1, and a control panel 7 provided with an operation panel including an input unit and a display unit (not illustrated) is arranged on a surface of the saddle 1. Therefore, cutting information according to material quality and a plate thickness of the material to be cut F placed on the surface plate D, information of a shape to be cut from the material to be cut F, and the like can be input to the numerical value control device by operating the control panel that configures the control panel 7.

Then, after necessary information for cutting the material to be cut F is input, an operation of the cutting trolley A is started, so that the traveling motor 1a and the transverse motor 3a are controlled at the same time, and the material to be cut F is irradiated with laser light while the laser nozzle 5 mounted on the transverse carriage 3 is moved, whereby an intended product can be cut from the material to be cut F.

Next, a configuration of the cover B will be described. The cover B is configured to prevent leakage of reflected light that is laser light irradiated through the laser nozzle 5 and reflected from the material to be cut F or an end material (not illustrated), by covering an upper surface of the cutting trolley A, both sides in a direction perpendicular to the laying direction of the rails E (hereinafter, the direction is referred to as "transverse direction"), and both side surfaces of the direction along the rails E (hereinafter, the direction is referred to as "traveling direction").

However, the cover B is not configured to cover the cutting trolley A without limitation, an is configured to cover a movable range of the laser nozzle 5 in the transverse direction (in the entire length of the surface plate D in the transverse direction) and a range of the cutting trolley A in the traveling direction, which is set in advance. Especially, the cover B is configured to cover a range from a lower surface of the garter 2 that configures the cutting trolley A, which is both end portions of the surface plate D in the transverse direction, to the saddle 1 placed on the rails E.

The cover B is configured from an upper surface cover body 11 arranged on an upper surface side of the cutting trolley A, a front cover body 12 serving as a laser nozzle-side cover body arranged on a laser nozzle 5 side (hereinafter, referred to as "front") of the cutting trolley A, a back cover body 13 serving as a garter-side cover body 13 arranged on an opposite side (hereinafter, referred to as "back") of the laser nozzle 5, and side surface cover bodies 14 and 15 arranged on both sides in the traveling direction.

A plurality of columns is arranged in the saddle 1 and/or the garter 2 in the cutting trolley A, and a structure (not illustrated) made of beams and frames by connecting the pillars is configured. Then, members that configure the cover B (the cover bodies 11 to 15) are fixed to or attached, in an openable/closable manner, to the structure.

The upper surface cover body 11 is fixed to and supported by the structure. A front-side end portion is positioned not to disturb traverse of the laser nozzle 5 mounted on the transverse carriage 3, and a back-side end portion is positioned not to interfere with the laser oscillator 6 arranged on the back side of the garter 2 and the control panel 7 arranged on the saddle 1. Further, both end portions of the upper surface cover body 11 in the transverse direction protrude more outward than the saddle 1 of the cutting trolley A. The positions of the both end portions of the upper surface cover body 11 in the transverse direction are not limited as long as maintenance work of the control panel 7 provided on the saddle 1 is possible. Further, a rail 11a in the transverse direction is provided on the front-side end portion of the upper surface cover body 11.

An upper end of the front cover body 12 includes a portion fixed to the upper surface cover body 11. Doors 12a and 12b configured to be movable in the transverse direction along the rail 11a are arranged in a central portion. Doors 12c and 12d that open from the center are arranged in both end portions in the transverse direction.

The front cover body 12 in the transverse direction has the same length as the upper surface cover body 11. Further, the length in the traveling direction is favorably a dimension that can hold a sufficient distance with which the reflected light is repeatedly reflected and attenuated inside the cover B, the reflected light being the irradiated laser light that is reflected from the surface of the material to be cut F and is reflected from the surface plate D after penetrating the material to be cut F.

Therefore, a distance L from the front-side end surface of the front cover body 12 to the laser nozzle 5 is set to a necessary distance in which the reflected light is sufficiently attenuated. Further, it is favorable to attach the light-blocking member C to the lower end portion of the front cover body 12 configured as described above. However, the volume may become large with the front cover body 12 configured as described above.

Therefore, in the present embodiment, the front cover body 12 is formed to configure a requisite minimum space for maintenance and inspection work of the laser nozzle 5 without disturbing the traverse of the laser nozzle 5 mounted on the transverse carriage 3. Then, in the front cover body 12 configured to minimize the volume, an eaves-like cover body 12e is attached to a lower end side of the front cover body 12 to reliably prevent leakage of the reflected light of the laser light radiated on the material to be cut F. In this case, it is essential to attach the light-blocking member C to a lower end portion of the eaves-like cover body 12e, and it is favorable to attach the light-blocking member C to the lower end portion of the front cover body 12.

In the front cover body 12 configured as described above, the laser nozzle 5 and the transverse carriage 3 of the cutting trolley A can be exposed by moving the doors 12a and 12b in the transverse direction, and necessary maintenance and inspection work for these portions can be performed. Further, the control panel 7 can be exposed and necessary information is input, or maintenance and inspection of devices including the traveling motor 1a can be performed by opening the doors 12c and 12d.

The eaves-like cover body 12e is formed to have a larger dimension in the transverse direction than the surface plate D in the transverse direction, and is formed to have a distance L from an end surface 12f to the laser nozzle 5 in the traveling direction, which is a dimension set in advance, that is, a dimension in which the reflected light can be sufficiently attenuated. The distance L is appropriately set according to conditions such as the maximum thickness set to the material to be cut F, the depth of the surface plate D, and the depth of the eaves-like cover body 12e. Therefore, the light-blocking members C are attached to three lower end portions of the eaves-like cover body 12e including the lower end portion in the transverse direction and both sides in the traveling direction.

The back cover body 13 is fixed such that an upper end is connected to the back side of the upper surface cover body 11. A fan 13a is arranged on the back cover body 13, and is configured to ventilate the air existing in the space surrounded by the cover B, and fume generated in association with progress of cutting of the material to be cut F.

An eaves-like cover body 13b is attached to a lower end side of the back cover body 13. The eaves-like cover body 13b has an approximately similar shape to the eaves-like cover body 12e, and has a larger dimension in the transverse direction than the surface plate D in the transverse direction. In this case, it is essential to attach the light-blocking member C to a lower end portion of the eaves-like cover body 13b, and it is favorable to attach the light-blocking member C to a lower end portion of the back cover body 13.

Further, conditions such as the distance to the laser nozzle 5 are the same as those of the eaves-like cover body 12e. However, in the case of the back cover body 13, the garter 2 exists between the back cover body 13 and the laser nozzle 5, and thus the back cover body 13 has a dimension in consideration of dimensions of the garter 2 and dimensions of the devices placed on the garter 2.

Note that, in the present embodiment, both the eaves-like cover bodies 12e and 13b are attached to protrude from the front cover body 12 and the back cover body 13 in the traveling direction. However, an embodiment is not limited to this configuration, and the eaves-like cover bodies 12e and 13b may be attached to approach each other inward in the front cover body 12 and the back cover body 13, or one of the eaves-like cover bodies 12e and 13b may protrude and the other may be attached inward.

The side surface cover bodies 14 and 15 are fixed such that upper ends are connected to the upper surface cover body 11, and front-side end portions are connected to the front cover body 12 and back-side end portions are connected to the back cover body 13. These side surface cover bodies 14 and 15 protrude more outward than the saddle 1 of the cutting trolley A in the transverse direction. The end portions of the saddle 1 and the garter 2, and the control panel 7 exist between the side surface cover bodies 14 and 15, and the surface plate C, and thus these portions block the reflected light of the laser light radiated on the material to be cut F. Therefore, no eaves-like cover bodies are configured to lower end portions of the side surface cover bodies 14 and 15.

Figure 4A:
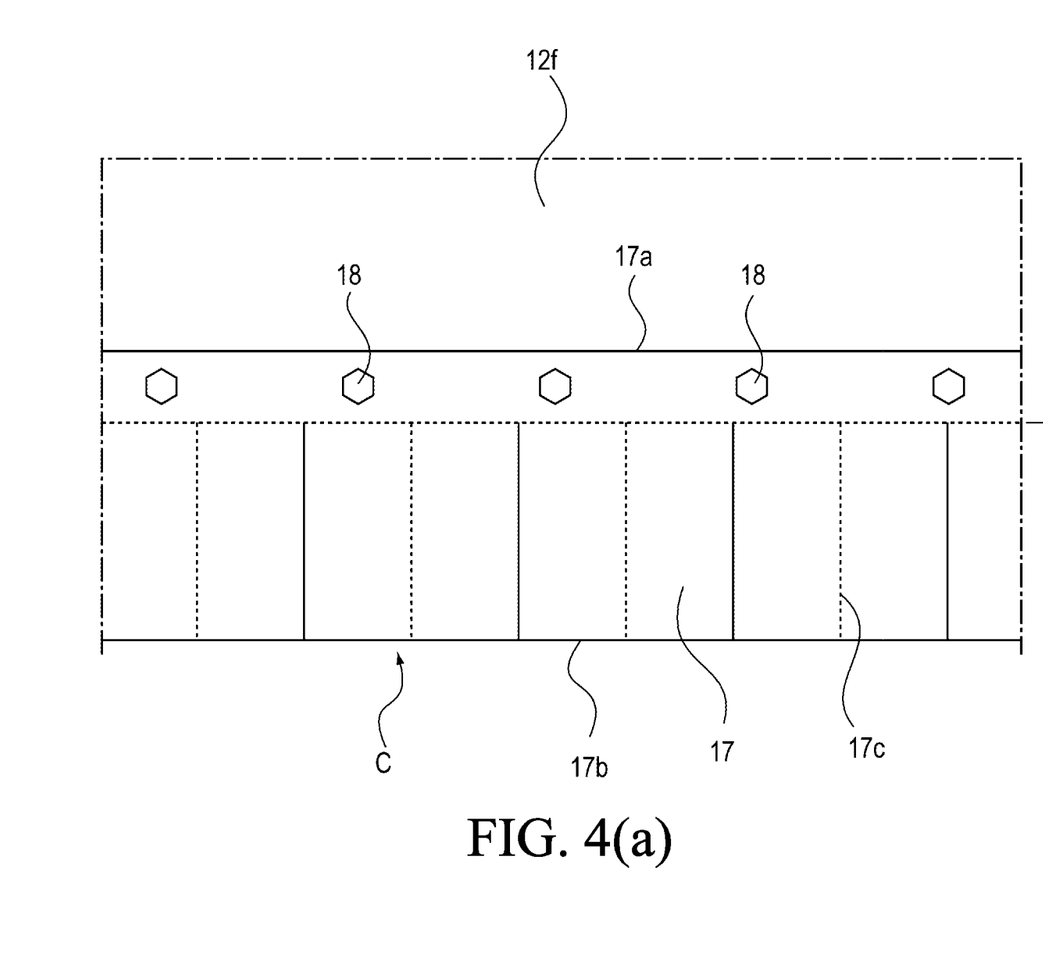
FIGS. 4(a) and 4(b) are diagrams for describing a configuration of a light-blocking member attached to a lower end portion of a cover.
Figure 4B:
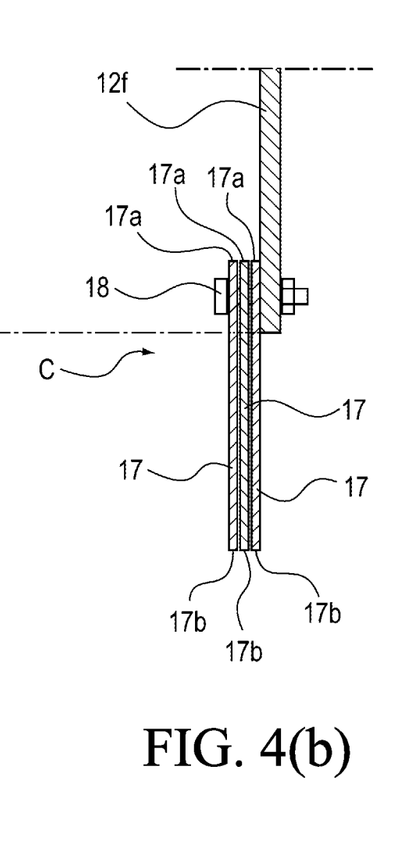

As illustrated in FIGS. 4(a) and 4 (b), the light-blocking member C is configured such that three light-blocking sheets 17 made of rubber and having flexibility and a light-blocking property are layered. Then, upper ends 17a of the light-blocking sheets 17 are attached to corresponding portions in the lower end portions of the front cover body 12, the back cover body 13, and the eaves-like cover bodies 12e and 13b (hereinafter, referred to as eaves-like cover body 12e as a representative).

When the light-blocking sheet 17 is attached to the eaves-like cover body 12e, the light-blocking sheet 17 has a sufficient dimension in a height direction in which a lower end 17b comes below the upper surface of the surface plate D. Further, the light-blocking sheets 17 are attached to the three portions of the eaves-like cover body 12e, and thus length dimensions (lengths in the transverse direction or in the traveling direction) of the individual light-blocking sheets 17 are not limited, and a plurality of the light-blocking sheets 17 is respectively attached continuously in longitudinal directions.

As described above, the light-blocking sheet 17 that configures the light-blocking member C is consumables because the lower end 17b comes in contact with the upper surface of the surface plate D and the surface of the material to be cut F and is worn. Therefore, the light-blocking sheet 17 is configured to be attachable/detachable using bolts 18 so that replacement work for the eaves-like cover body 12e becomes easy.

Further, the three layered light-blocking sheets 17 respectively have slits 17c formed in a vertical direction, and are subdivided in a curtain manner with the slits 17c. As described above, the dimension to subdivide the light-blocking member C (an interval dimension in forming the slits) is not especially limited, and it is favorable to appropriately set the dimension according to rigidity of the material that configures the light-blocking member C. In the present embodiment, the slits 17c are formed at intervals of 150 mm in the light-blocking sheet 17 with the thickness of 0.5 to 3 mm. Then, the three light-blocking sheets 17 are layered such that the respective slits 17c are arranged in different positions from each other, thereby to configure the light-blocking member C.

Figure 1:
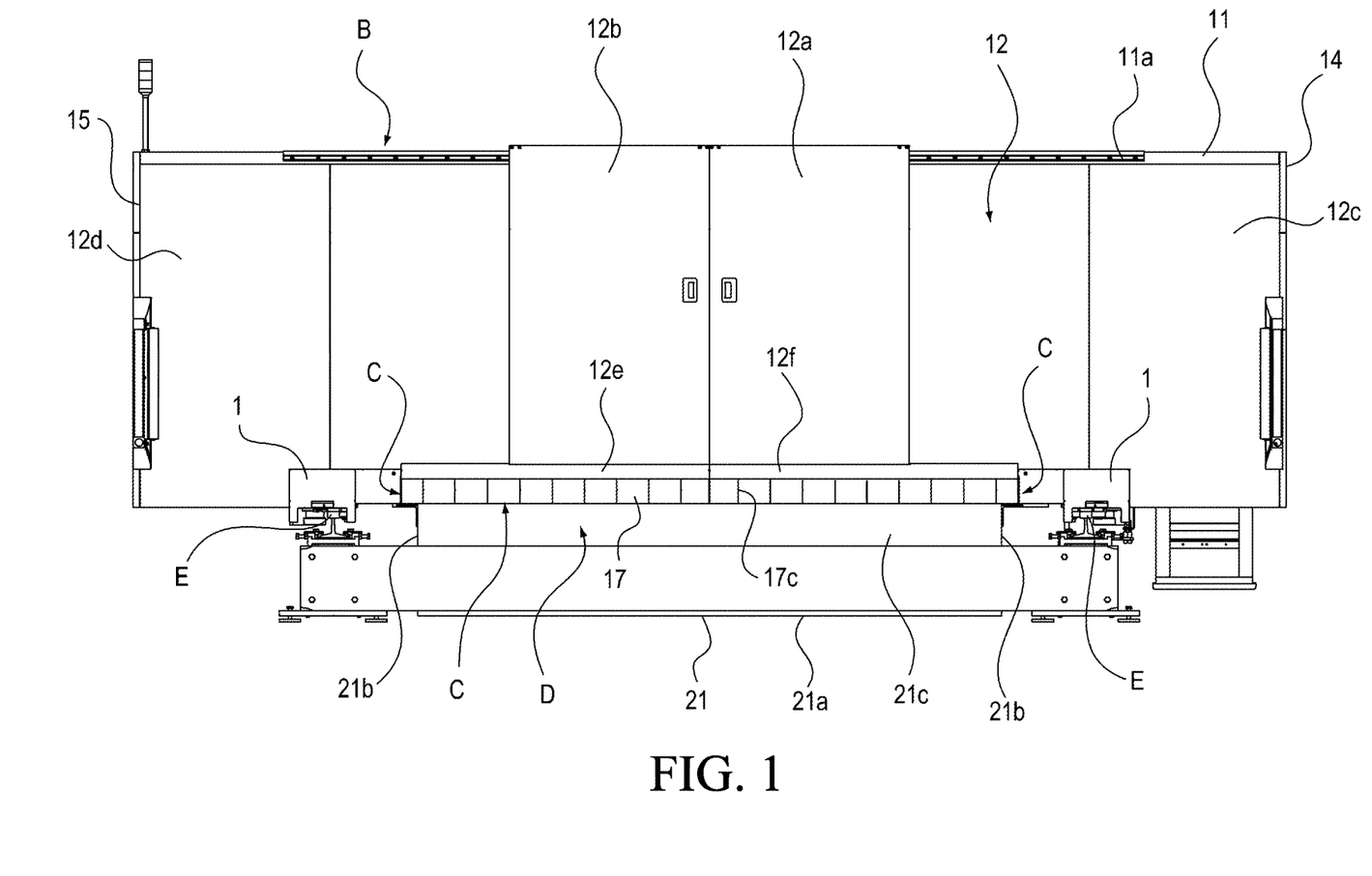
FIG. 1 is a front view for describing a configuration of a laser machining device.
Figure 2A:
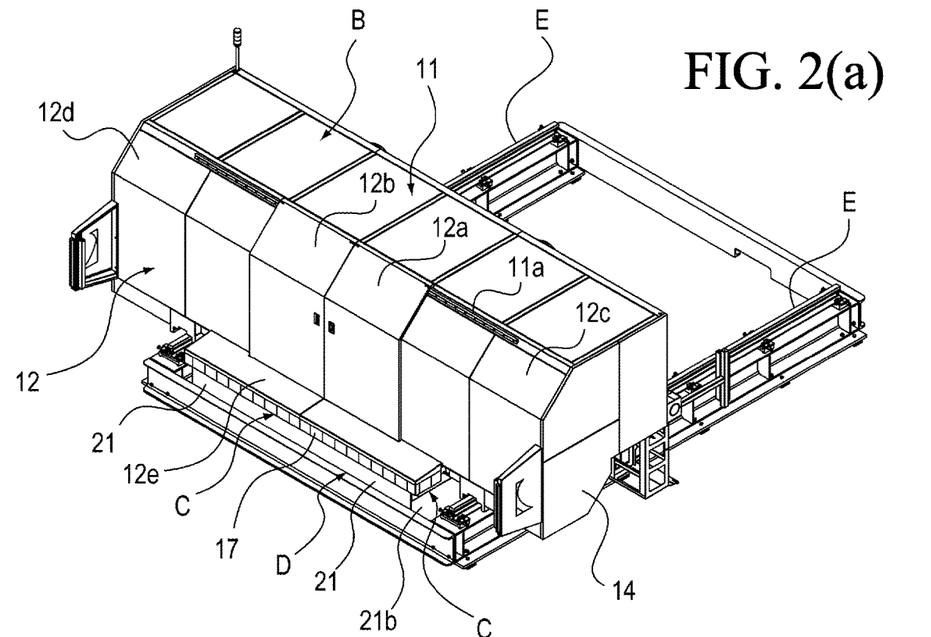
FIGS. 2(a) and 2(b) are a front perspective view and a back perspective view for describing the configuration of the laser machining device.
Figure 2B:
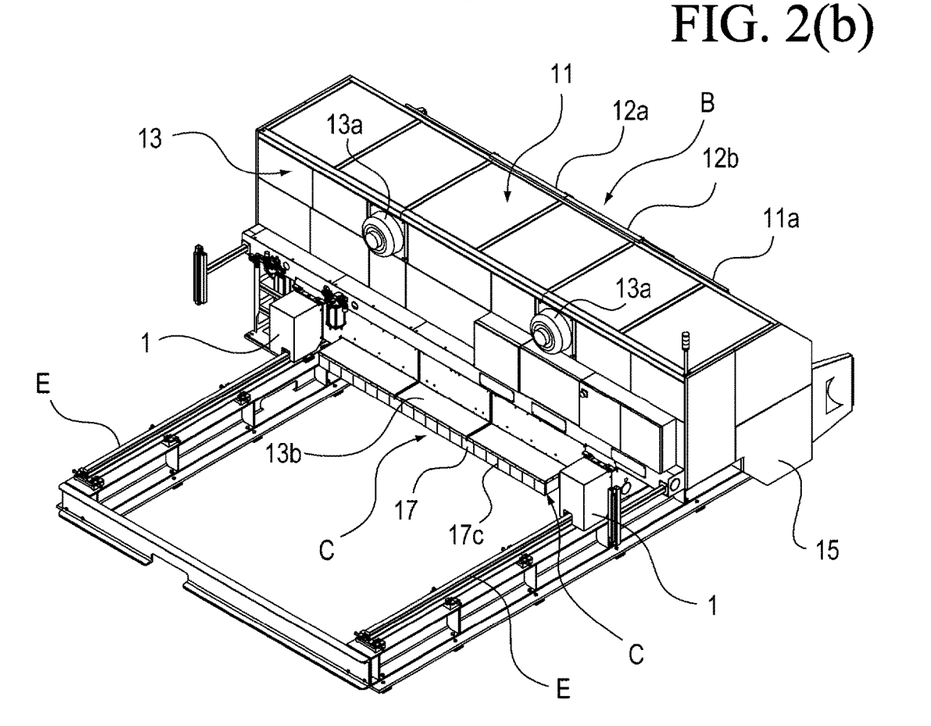

The surface plate D allows the material to be cut F to be placed thereon and supports the material to be cut F, and is set in a range between the rails E and a shorter range than the laying length of the rails E. Further, the surface plate D serves as an effective cutting region in the laser cutting device. In some cases, the surface plate D is configured to have approximately the same length as the laid rails E. In some cases, the region to which the cutting trolley A is retracted when the arrangement to carry in and out the material to be cut F to and from the surface plate D is conducted is configured, as illustrated in FIGS. 2(a) and 2(b).

Figure 5A:
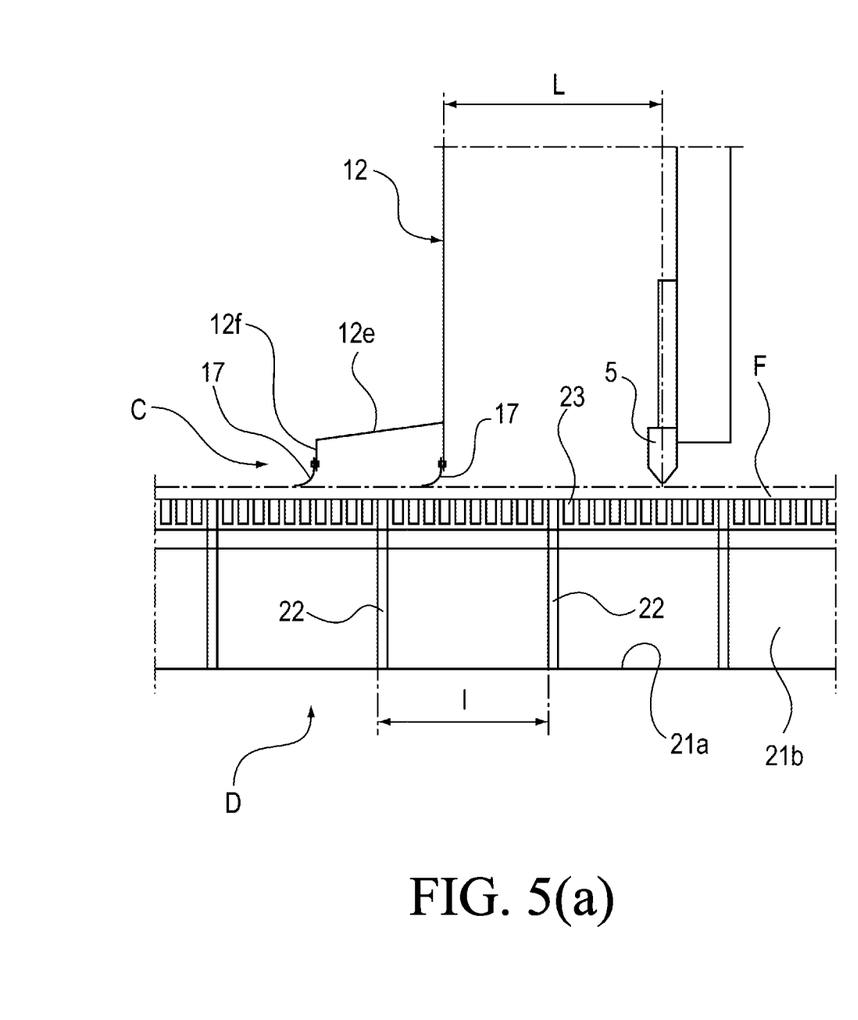
FIGS. 5(a) and 5(b) are schematic diagrams for describing a configuration of a surface plate.
Figure 5B:
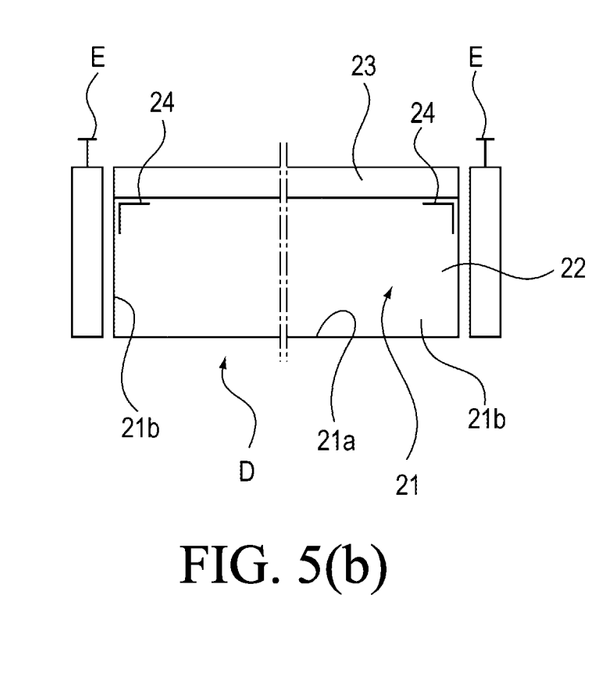

The surface plate D includes a vessel 21 having dimensions respectively set in advance in the transverse direction, in the traveling direction, and in the depth direction, a partition plate 22 that partitions the vessel 21 into small portions having an interval 1 set in advance, and a plurality of support members 23 arranged in an upper portion of the vessel 21.

The vessel 21 in the transverse direction has a dimension with which the vessel 21 can easily support the material to be cut F with the maximum width set in advance. Similarly, the vessel 21 in the traveling direction has a dimension with which the vessel 21 can easily support the length dimension of the material F to be supported and the number of the materials F to be supported. Further, the depth of the vessel 21 is not especially limited, and is appropriately set according to conditions of a factory in which the laser cutting device is installed. Therefore, the vessel 21 includes a bottom plate 21a, side plates 21b arranged in the traveling direction along the rails E, and end plates 21c arranged in the transverse direction on both sides in the traveling direction.

A plurality of the partition plates 22 is arranged to hold the interval 1 set in advance, and is arranged over the entire length of the vessel 21 in the transverse direction, and up to the bottom plate 21a. Therefore, the vessel 21 is partitioned into the plurality of independent small portions with the interval 1 of the partition plates 22, regardless of the dimension in the traveling direction.

Especially, the interval 1 between the adjacent partition plates 22 is set to a dimension smaller than the distance L from the end surface 12f of the eaves-like cover body 12e to the laser nozzle 5. For example, in a case where the distance L from the end surface 12f of the eaves-like cover body 12e to the laser nozzle 5 is set to 600 mm, the interval 1 between the partition plates 22 is set to 500 mm. However, the interval 1 is not limited to this dimension, and can be appropriately set according to conditions such as the thickness of the material to be cut and the depth of the surface plate D, as might be expected.

The support member 23 is supported by a bracket 24 provided to the side plate 21b that configures the vessel 21. An upper end portion of the support member 23 is damaged by the laser light with the progress of cutting of the material to be cut F. Therefore, the frequency of replacement of the support member 23 becomes high, and the support member 23 is configured to be easily replaced. Especially, as the support member 23, a metal mesh member made of a flat bar or an expand metal, or a honeycomb member can be appropriately employed.

Figure 6A:
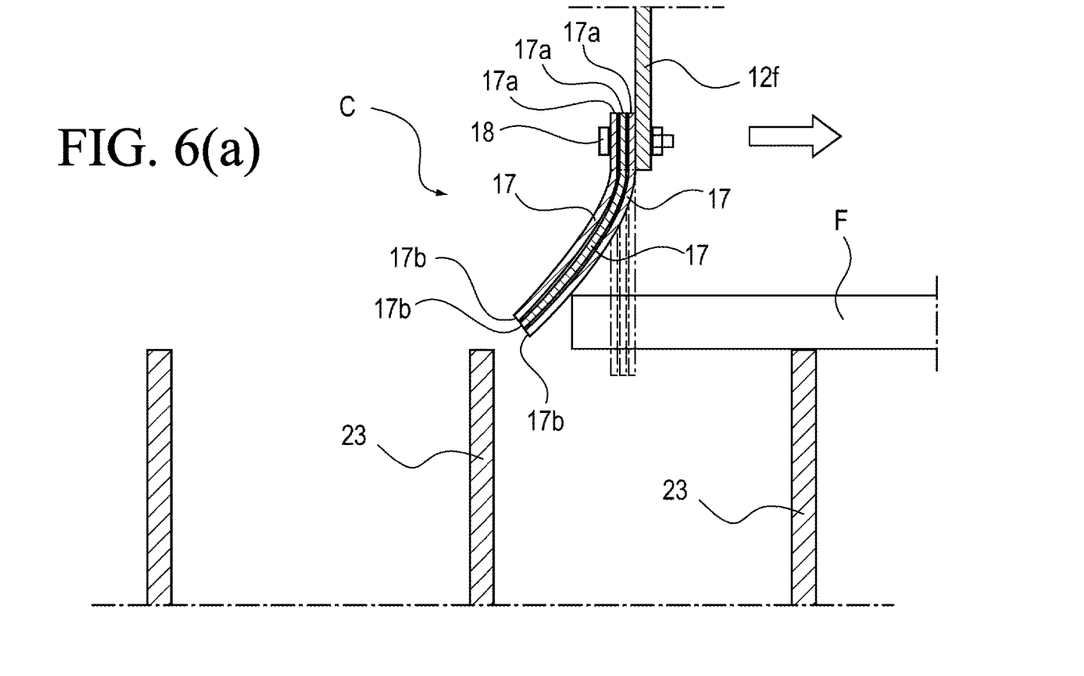
FIGS. 6(a) and 6(b) are diagrams for describing a state in which a gap between the lower end portion of the cover and the surface plate is blocked with the light-blocking member.

Next, a light-blocking action by the light-blocking member C when the material to be cut F is placed on the surface plate D configured as described above, and cutting work is started in this state will be described with reference to FIGS. 6(a) and 6(b). Note that the cutting of the material to be cut F progresses in the arrow direction illustrated in FIGS. 6(a) and 6(b).

when the cutting of the material to be cut F is started, and the cutting trolley A travels in the arrow direction, the light-blocking sheet 17 that configures the light-blocking member C comes in contact with the end surface along the transverse direction of the material to be cut F, as illustrated in FIG. 6(a). As a result, the light-blocking sheet 17 is bent. In this state, the light-blocking sheet 17 comes in contact with a corner of the end surface and the surface of the material to be cut F, thereby to block the gap between the end surface 12f of the eaves-like cover body 12e that configures the front cover body 12 and the surface of the material to be cut F.

Figure 6B:
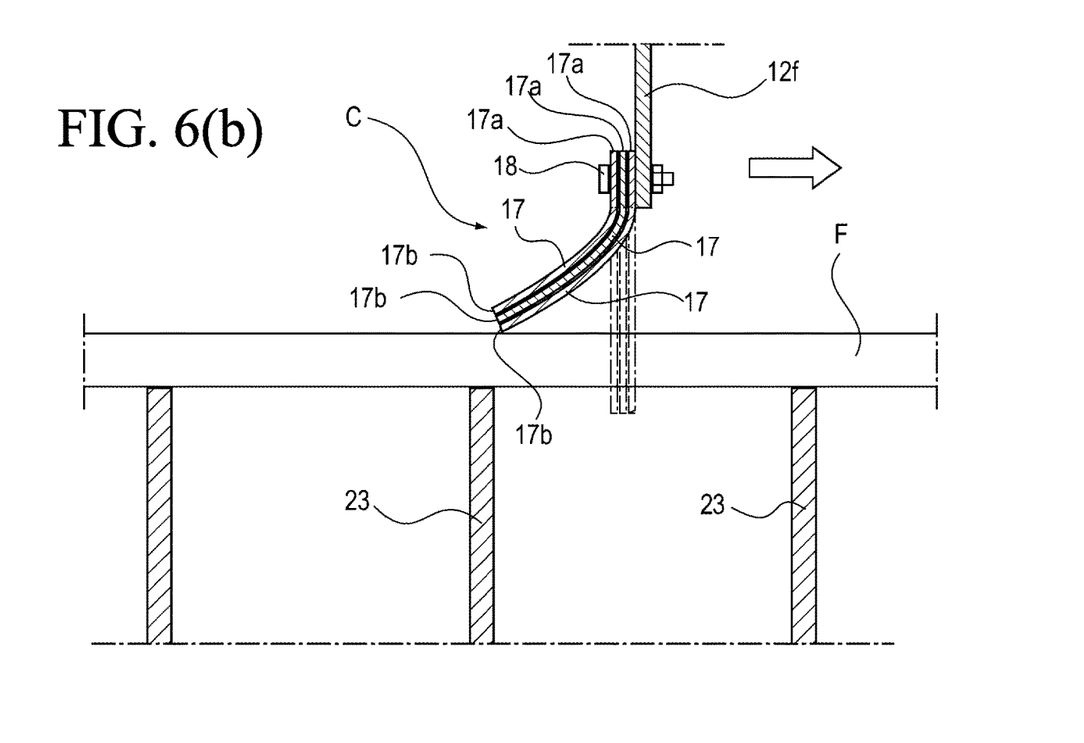

Further, the lower end 17b of the light-blocking sheet 17 holds the contact state to the surface of the material to be cut F, as illustrated in FIG. 6 (b), with the continuous travel of the cutting trolley A in the arrow direction. Therefore, the lower end 17b can blocks the gap between the end surface 12f of the eaves-like cover body 12e and the surface of the material to be cut F.

Especially, when the traveling direction of the cutting trolley A is changed to a reverse direction to the arrow direction illustrated in FIGS. 6(a) and 6(b), the light-blocking sheet 17 that configures the light-blocking member C has flexibility, and thus can be bent to hold the contact state of the lower end 17b to the surface of the material to be cut F. Therefore, the light-blocking sheet 17 can hold the light-blocking property and follow the change of the cutting trolley A in the traveling direction.

Further, the light-blocking sheet 17 facing the end surface along the traveling direction of the material to be cut F is subdivided by the slits 17c. Therefore, one side of the subdivided light-blocking sheets 17 exists on the surface side of the material to be cut F, and the other side exists on the upper surface side of the surface plate D. Therefore, the subdivided light-blocking sheet 17 is diagonally bent, so that a triangular gap is formed between the end surface along the traveling direction of the material to be cut F and the upper surface of the surface plate D.

However, the light-blocking member C is configured from the three layered light-blocking sheets, and thus the gap can be made extremely small. Even in a case where the laser nozzle 5 approaches the end surface along the traveling direction of the material to be cut F, leakage of the reflected light can be minimized.

Especially, the light-blocking member C is provided to the lower end of the end surface 12f along the traveling direction, of the eaves-like cover body 12e. Therefore, the cover B is arranged above, and the light-blocking member C is arranged on the gap formed between the upper surface of the surface plate D and the cover B, around the laser nozzle 5. Therefore, the reflected light of the laser light radiated on the material to be cut F is blocked by the cover B and the light-blocking member C and cannot leak outside.

INDUSTRIAL APPLICABILITY

The laser machining device according to the present invention can be used for a laser cutting device or a laser welding device using a solid-state laser, a fiber laser, or a carbon dioxide laser.

REFERENCE SIGNS LIST

A Cutting trolley
B Cover
C Light-blocking member
D Surface plate
E Rail
F Material to be cut
1 Saddle
1a Traveling motor
2 Garter
2a Transverse rail
3 Transverse carriage
3a Transverse motor
4 Lifting member
4a Lifting motor
5 Laser nozzle
6 Laser oscillator
7 Control panel
11 Upper surface cover body
11a Rail
12 Front cover body
12a to 12d Door
12e, 13b Hood-like cover body
12f End surface
13 Back cover body
13a Fan
14 and 15 Side surface cover body
17 Light-blocking sheet
17a Upper end
17b Lower end
17c Slit
18 Bolt
21 Vessel 21a Bottom plate
21b Side plate
21c End plate
22 Partition plate
23 Support member
24 Bracket

The invention claimed is:

1. A laser machining device that cuts or welds a material to be machined by irradiating the material to be machined with laser light, the laser machining device comprising:
   a) a surface plate on which the material to be machined is placed;
   b) rails arranged along the surface plate;
   c) a machining trolley including a saddle mounted on the rails, a garter arranged in a direction perpendicular to the rails and connected to the saddle, a transverse carriage mounted on a transverse rail provided on the garter, and a laser nozzle mounted on the transverse carriage, and configured to cut or weld the material to be machined by irradiating the material to be machined with the laser light through the laser nozzle while allowing the saddle to travel along the rails and the transverse carriage to perform traverse along the transverse rail;
   d) a cover that covers the machining trolley, and includes an upper surface cover body arranged on an upper surface side of the machining trolley, a laser nozzle-side cover body arranged on a laser nozzle side of the machining trolley and having an upper end connected to the upper surface cover body, a garter-side cover body arranged on an opposite side to the laser nozzle of the machining trolley and having an upper end connected to the upper surface cover body, and a side surface cover body having an upper end connected to the upper surface cover body and both ends in a width direction connected to the laser nozzle-side cover body and the garter-side cover body;
   e) wherein a first light-blocking member and a second light-blocking member both having flexibility are attached respectively to lower end sides of the laser nozzle-side cover body and the garter-side cover body that configure the cover, the first light-blocking member and the second light-blocking member being for preventing leakage of the laser light through gaps between the lower end portions and the upper surface of the surface plate; and
   f) wherein each of the first light-blocking member and the second light-blocking member is configured from a plurality of sheets that has flexibility and a light-blocking property, and is layered in a direction in which the machining trolley is moved along the rails, and an upper end of the layered sheets is attached to the lower end side of the laser nozzle-side cover body or the garter-side cover body.

2. The laser machining device according to claim 1, wherein:
   a) an eaves-like cover body formed into an eaves shape is attached to a lower end of the laser nozzle-side cover body or the garter-side cover body that configures the cover in a direction along the rails, and a third light-blocking member having flexibility is attached to a lower end side of the eaves-like cover body, the third light-blocking member being for preventing leakage of the laser light through a gap between the lower end portion and the upper surface of the surface plate.

3. The laser machining device according to claim 2, wherein:
   a) the third light-blocking member is configured from a plurality of sheets that has flexibility and a light-blocking property, and is layered in a direction in which the machining trolley is moved along the rails, and an upper end of the layered sheets is attached to the lower end side of the eaves-like cover body.

4. The laser machining device according to claim 3, wherein:
   a) each of the first light-blocking member, the second light-blocking member and the third light-blocking member is configured from the plurality of sheets that has flexibility and a light-blocking property, and is layered, and having a slit formed in a different position in every sheet.

5. The laser machining device according to claim 4, wherein:
   a) the laser light is emitted from a solid-state laser oscillator or a fiber laser oscillator.

6. The laser machining device according to claim 5, wherein:
   a) the surface plate includes a plurality of partition plates that rises from a bottom surface of the surface plate and partitions the surface plate, and a plurality of support members arranged between the partition plates and having a lower end not reaching the bottom surface of the surface plate, and an interval between the plurality of partition plates is smaller than a smallest distance, of a first distance from the laser nozzle of the machining trolley to the first light-blocking member attached to the lower end side of the laser nozzle-side cover body, a second distance from the laser nozzle to the third light-blocking member attached to the lower end side of the eaves-like cover body attached to the lower end side of the laser nozzle-side cover body, a third distance from the laser nozzle to the second light-blocking member attached to the lower end side of the garter-side cover body, and a fourth distance from the laser nozzle to the third light-blocking member attached to the lower end side of the eaves-like cover body attached to the lower end side of the garter-side cover body.

7. The laser machining device according to claim 2, wherein:
   a) the surface plate includes a plurality of partition plates that rises from a bottom surface of the surface plate and partitions the surface plate, and a plurality of support members arranged between the partition plates and having a lower end not reaching the bottom surface of the surface plate, and an interval between the plurality of partition plates is smaller than a smallest distance, of a first distance from the laser nozzle of the machining trolley to the first light-blocking member attached to the lower end side of the laser nozzle-side cover body, a second distance from the laser nozzle to the third light-blocking member attached to the lower end side of the eaves-like cover body attached to the lower end side of the laser nozzle-side cover body, a third distance from the laser nozzle to the second light-blocking member attached to the lower end side of the garter-side cover body, and a fourth distance from the laser nozzle to the third light-blocking member attached to the lower end side of the eaves-like cover body attached to the lower end side of the garter-side cover body.

8. The laser machining device according to claim 1, wherein:

a) each of the first light-blocking member and the second light-blocking member is configured from the plurality of sheets that flexibility and a light-blocking property, and layered, and having a slit formed in a different position in every sheet.

9. The laser machining device according to claim 1, wherein:
a) the laser light is emitted from a solid-state laser oscillator or a fiber laser oscillator.

\* \* \* \* \*